United States Patent
Doyle et al.

(10) Patent No.: US 7,270,537 B2
(45) Date of Patent: *Sep. 18, 2007

(54) NON-COAXIAL INJECTION MOLDING VALVE FLOW CONTROL

(75) Inventors: Mark Doyle, Newburyport, MA (US); Vito Galati, Rowley, MA (US); Wesley D. Frisin, Danvers, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/351,243

(22) Filed: Feb. 9, 2006

(65) Prior Publication Data

US 2006/0127527 A1 Jun. 15, 2006

Related U.S. Application Data

(63) Continuation of application No. 10/328,457, filed on Dec. 23, 2002, now Pat. No. 7,029,268.

(60) Provisional application No. 60/399,409, filed on Jul. 31, 2002.

(51) Int. Cl.
*B29C 45/23* (2006.01)
(52) U.S. Cl. ........................ 425/562; 425/564
(58) Field of Classification Search ............ 425/145, 425/149, 562, 564, 572, DIG. 225; 264/40.1, 264/40.5, 328.8
See application file for complete search history.

(56) References Cited

U.S. PATENT DOCUMENTS 3,535,742 A 10/1970 Marcus (Continued)

FOREIGN PATENT DOCUMENTS

CA 1204906 5/1986

(Continued)

OTHER PUBLICATIONS

U.S. Appl. No. 10/269,927, filed Oct. 11, 2002, Fuller et al.

(Continued)

*Primary Examiner*—Tim Heitbrink
(74) *Attorney, Agent, or Firm*—Kissman Jobse Hendricks Oliverio LLP

(57) ABSTRACT

In an injection molding machine having upstream and downstream channels communicating with each other for delivering fluid material to one or more mold cavities, apparatus for controlling delivery of the melt material from the channels to the one or more mold cavities, each channel having an axis, the downstream channel having an axis intersecting a gate of a cavity of a mold, the upstream channel having an axis not intersecting the gate and being associated with an upstream actuator interconnected to an upstream melt flow controller disposed at a selected location within the upstream channel, the apparatus comprising a sensor for sensing a selected condition of the melt material at a position downstream of the upstream melt flow controller; an actuator controller interconnected to the upstream actuator, the actuator controller comprising a computer interconnected to a sensor for receiving a signal representative of the selected condition sensed by the sensor, the computer including an algorithm utilizing a value indicative of the signal received from the sensor as a variable for controlling operation of the upstream actuator; wherein the upstream melt flow controller is adapted to control the rate of flow of the fluid material at the selected location within the upstream channel according to the algorithm.

24 Claims, 13 Drawing Sheets

U.S. PATENT DOCUMENTS

| | | | |
|---|---|---|---|
| 3,780,764 A | 12/1973 | Geist | 137/613 |
| 3,820,928 A | 6/1974 | Lemelson | 425/146 |
| 3,861,841 A | 1/1975 | Hanning | 425/146 |
| 3,952,927 A | 4/1976 | Schaumburg et al. | 222/510 |
| 4,389,002 A | 6/1983 | Devellian et al. | 222/146 |
| 4,424,015 A | 1/1984 | Black et al. | 425/138 |
| 4,500,279 A | 2/1985 | Devellian et al. | 425/548 |
| 4,521,179 A | 6/1985 | Gellert | 425/548 |
| 4,588,367 A | 5/1986 | Schad | 425/549 |
| 4,592,711 A | 6/1986 | Capy | 425/144 |
| 4,701,292 A | 10/1987 | Valyi | 264/155 |
| 4,720,253 A | 1/1988 | Koentges | 425/145 |
| 4,863,369 A | 9/1989 | Schad et al. | 425/547 |
| 4,931,234 A | 6/1990 | Schad et al. | 264/40.1 |
| 4,932,854 A | 6/1990 | Matsuda et al. | 425/144 |
| 5,078,589 A | 1/1992 | Osuna-Diaz | 425/562 |
| 5,141,696 A | 8/1992 | Osuna-Diaz | 264/297.2 |
| 5,149,547 A | 9/1992 | Gill | 425/145 |
| 5,192,555 A | 3/1993 | Arnott | 425/544 |
| 5,249,947 A | 10/1993 | Inaba et al. | 425/150 |
| 5,281,374 A | 1/1994 | Matsuda et al. | 264/39 |
| 5,288,222 A | 2/1994 | Wieser | 425/190 |
| 5,356,576 A | 10/1994 | Fischbach | 264/40.4 |
| 5,389,315 A | 2/1995 | Yabushita | 264/40.1 |
| 5,492,467 A | 2/1996 | Hume et al. | 425/549 |
| 5,545,028 A | 8/1996 | Hume et al. | 425/549 |
| 5,554,395 A | 9/1996 | Hume et al. | 425/549 |
| 5,556,582 A | 9/1996 | Kazmer | 264/40.1 |
| 5,601,773 A | 2/1997 | Schmidt et al. | 264/328.8 |
| 5,674,439 A | 10/1997 | Hume et al. | 264/40.6 |
| 5,871,786 A | 2/1999 | Hume et al. | 425/549 |
| 5,885,624 A | 3/1999 | Katsuta et al. | 425/149 |
| 5,885,628 A | 3/1999 | Swenson et al. | 425/549 |
| 5,894,025 A | 4/1999 | Lee et al. | 425/562 |
| 5,916,605 A | 6/1999 | Swenson et al. | 426/564 |
| 5,948,448 A | 9/1999 | Schmidt | 425/192 R |
| 5,948,450 A | 9/1999 | Swenson et al. | 425/562 |
| 5,980,237 A | 11/1999 | Swenson et al. | 425/549 |
| 6,000,831 A | 12/1999 | Triplett | 364/475.09 |
| 6,027,328 A | 2/2000 | Herbst | 425/553 |
| 6,062,840 A | 5/2000 | Lee et al. | 425/130 |
| 6,099,767 A | 8/2000 | Tarr et al. | 264/40.1 |
| 6,145,022 A | 11/2000 | Takizawa et al. | 710/10 |
| 6,206,674 B1 | 3/2001 | Foltuz et al. | 425/185 |
| 6,254,377 B1 | 7/2001 | Kazmer et al. | 425/562 |
| 6,261,075 B1 | 7/2001 | Lee et al. | 425/130 |
| 6,261,084 B1 | 7/2001 | Schmidt | 425/564 |
| 6,287,107 B1 | 9/2001 | Kazmer et al. | 425/562 |
| 6,294,122 B1 | 9/2001 | Moss et al. | 264/328.9 |
| 6,309,208 B1 | 10/2001 | Kazmer et al. | 42/562 |
| 6,343,921 B1 | 2/2002 | Kazmer et al. | 425/145 |
| 6,343,922 B1 | 2/2002 | Kazmer et al. | 425/145 |
| 6,361,300 B1 | 3/2002 | Kazmer | 425/145 |
| 6,419,870 B1 | 7/2002 | Lee et al. | 264/328.1 |
| 6,436,320 B1 | 8/2002 | Kazmer et al. | 264/40.1 |
| 6,464,909 B1 | 10/2002 | Kazmer et al. | 264/40.1 |
| 6,514,440 B1 | 2/2003 | Kazmer et al. | 264/39 |
| 6,554,604 B1 | 4/2003 | Schmidt | |
| 6,585,505 B2 | 7/2003 | Kazmer et al. | |
| 6,632,079 B1 | 10/2003 | Kazmer et al. | |
| 6,713,002 B2 | 3/2004 | Moss et al. | |
| 6,769,896 B2 | 8/2004 | Moss et al. | |
| 6,824,379 B2 | 11/2004 | Moss et al. | |
| 7,029,268 B2* | 4/2006 | Doyle et al. | 425/562 |
| 2002/0086086 A1 | 7/2002 | Doyle et al. | |
| 2002/0121713 A1 | 9/2002 | Moss et al. | |
| 2002/0190413 A1 | 12/2002 | Kazmer et al. | |

FOREIGN PATENT DOCUMENTS

| | | |
|---|---|---|
| CA | 2246771 | 1/2002 |
| DE | 203 41 63 | 2/1971 |
| DE | 24 01 168 | 7/1975 |
| DE | 299 09 535 | 8/1999 |
| DE | 19811466 A1 | 9/1999 |
| EP | 0 911 137 | 4/1999 |
| EP | 0940242 | 8/1999 |
| EP | 1 052 078 A1 | 11/2000 |
| EP | 1 142 686 A1 | 10/2001 |
| JP | 58-142833 | 8/1983 |
| JP | 60-212321 | 10/1985 |
| JP | 61-63428 | 4/1986 |
| WO | WO97/43105 | 11/1997 |
| WO | WO98/56564 | 12/1998 |
| WO | WO99/54109 | 10/1999 |
| WO | WO99/59795 | 11/1999 |
| WO | WO 01/08462 | 2/2001 |
| WO | WO 02/36324 A1 | 2/2002 |

OTHER PUBLICATIONS

Kazmer, David O., et al., "Multi-Cavity Pressure Control in the Filling and Packing Stages of the Injection Molding Process," *Polymer Engineering and Science* (Nov. 1997) vol. 37, No. 11: 1865-1879.

Kazmer, David O., et al., "The Process Capability of Multi-Cavity Pressure Control for the Injection Molding Process," *Polymer Engineering and Science* (Nov. 1997) vol. 37, No. 11: 1880-1895.

Kazmer, David O., "Dynamic Feed Control: A New Method for Injection Molding of High Quality Plastic Parts," *A Dissertation submitted to the Design Division of Mechanical Engineering and the Committee on Graduate Studies in Partial Fulfillment of the Requirements for the Degree of Doctor of Philosophy in Mechanical Engineering,* Jun. 1995, (ii-xix, 2-199).

Abstract—Japanese Publication No. 20 00141439, May 23, 2000, Kobe Steel Ltd., "Injection Compression Molding Device."

Abstract—Japanese Publication No. 58 142833, Aug. 25, 1983, Kobe Steel Ltd., "Control Method for Injection Molding Machine".

Abstract—Japanese Publication No. 60 212321, Oct. 24, 1985, Yazaki Kako KK, "Quantity Control of Resin for Injection Compression Molding".

Abstract—Japanese Publication No. 61 063428, Jan. 4, 1986, Nippon Densco Co. Ltd., "Mold Assembly"

Abstract—Japanese Publication No. 63 166511, Jul. 9, 1988, Nissei Plastics Ind. Co., "Injection Molding."

International Search Report, mailed Feb. 2, 1999, PCT/US98/10798.

International Search Report, mailed Jun. 22, 2001, PCT/US01/04674.

European Search Report, dated Feb. 28, 2001, EP Application No. 00 12 4358.

International Search Report, dated Mar. 8, 2002, PCT/US01/42795.

International Search Report, dated May 5, 2002, PCT/US02/08364.

* cited by examiner

NON-COAXIAL INJECTION MOLDING VALVE FLOW CONTROL

RELATED APPLICATIONS

This is a continuation of U.S. patent application Ser. No. 10/328,457, filed Dec. 23, 2002 now U.S. Pat. No. 7,029,268 and claims the benefit of priority under 35 USC Section 119 to U.S. provisional patent application Ser. No. 60/399,409 filed Jul. 31, 2002, the disclosures of which are incorporated herein by reference in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,464,909, U.S. patent application Ser. No. 10/214,118, filed Aug. 8, 2002 (7006), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070).

BACKGROUND OF THE INVENTION

Injection molding systems comprise an injection molding machine having a barrel and a screw (or ram) housed within a barrel which injects a fluid material from an exit port of the barrel at a preselected velocity or profile of velocities over an injection cycle into a flow channel or system of channels in a distribution manifold which, in turn, direct the fluid to one or more injection ports which lead to one or more cavities of one or more molds.

Apparati have been developed for controlling the rate of flow of fluid material at a location within a flow channel, bore or nozzle having a straight axis that is aligned with the center of the gate of the mold cavity and along which a valve pin or other mechanical flow controlling mechanism is aligned for purposes of controlling material flow at the gate or at a position immediately upstream of the gate along the axis aligned with the gate. Such systems typically use an actuator mechanism that is aligned with the axis that intersects the gate.

SUMMARY OF THE INVENTION

In accordance with the invention there is provided in an injection molding apparatus having upstream and downstream channels communicating with each other for delivering fluid material to one or more mold cavities, an apparatus for controlling delivery of the melt material from the channels to the one or more mold cavities, each channel having an axis, the downstream channel having an axis intersecting a gate of a cavity of a mold, the upstream channel having an axis not intersecting the gate and being associated with an upstream actuator interconnected to an upstream melt flow controller disposed at a selected location within the upstream channel, the apparatus comprising: a sensor for sensing a selected condition of the melt material at a position downstream of the upstream melt flow controller; an actuator controller interconnected to the upstream actuator, the actuator controller comprising a computer interconnected to a sensor for receiving a signal representative of the selected condition sensed by the sensor, the computer including an algorithm utilizing a value indicative of the signal received from the sensor as a variable for controlling operation of the upstream actuator; wherein the upstream melt flow controller is adapted to control the rate of flow of the fluid material at the selected location within the upstream channel according to the algorithm.

The apparatus can include a downstream melt flow controller movable by a downstream actuator between open flow and closed flow positions within the downstream channel. The downstream actuator is preferably interconnected to the actuator controller, the algorithm utilizing the value indicative of the signal received from the sensor as a variable to control movement of the downstream melt flow controller between the open flow and closed flow positions.

The melt flow controller can be adapted to create a gap of controllably variable size within the upstream channel, the melt flow controller being movable to increase the size of the gap and the rate of flow upon upstream movement of the melt flow controller. The melt flow controller can movable to decrease the size of the gap and the rate of flow upon downstream movement of the melt flow controller.

The melt flow controller can comprises a pin having an axis slidably mounted for back and forth movement of the pin through the upstream channel; the pin having a bulbous protrusion along its axis, the bulbous protrusion having a smooth surface extending between an upstream end and a downstream end of the bulbous protrusion and a maximum diameter circumferential surface intermediate the upstream and downstream ends of the bulbous protrusion; the complementary surface of the upstream channel being complementary to the maximum diameter circumferential surface of the bulbous protrusion of the pin; the pin being slidable to a position within the upstream channel such that the maximum diameter circumferential surface of the bulbous protrusion mates with the complementary interior surface portion of the upstream channel. The melt flow controller can comprise a rotary valve.

During an injection cycle having a start point, an end point and an intermediate time duration, the algorithm typically includes a first set of instructions for moving the downstream melt flow controller to the open flow position at the start point and to the closed flow position at the end point and a second set of instructions for moving the upstream controller to a plurality of positions that control the rate of flow of fluid material during the intermediate time duration, the first and second sets of instructions utilizing the value indicative of the signal received from the sensor as a variable for controlling operation of the upstream and downstream actuators.

In another aspect of the invention there is provided, an apparatus for controlling flow of a fluid material in an injection molding apparatus having a flow channel system having an upstream flow channel having a first axis through which fluid material is routed to a downstream channel having a second axis leading to an exit aperture to a mold cavity, the apparatus comprising: a first valve mechanism comprising an actuator drivably interconnected to a fluid material contacting member disposed within the upstream flow channel; the upstream channel communicating with and delivering fluid material to the downstream channel, the downstream channel delivering the fluid material to the exit aperture, the first and second axes of the upstream and downstream channels being non-coaxial; the fluid material contacting member having an outer surface portion engageable with a complementary surface of a portion of the upstream flow channel to stop flow of the fluid material, the actuator being controllably drivable to drive the outer surface portion of the fluid material contacting member through a selected range of gap distance relative to the complementary surface of the upstream flow channel; the fluid material having a rate of flow through the flow channel system that varies according to the gap distance.

In another aspect of the invention there is provided, an apparatus for controlling flow of a fluid material in an injection molding apparatus having a flow channel system having an upstream flow channel having an axis through which fluid material is routed to a gate of a mold, the apparatus comprising: a first valve mechanism comprising a first actuator drivably interconnected to a fluid material contacting member disposed within the upstream flow channel; the upstream channel communicating with and delivering fluid material to the, the gate of the mold; the axis of the upstream channel being offset from and not intersecting the gate of the mold; the fluid material contacting member having an outer surface portion engageable with a complementary surface of a portion of the upstream flow channel to stop flow of the fluid material, the actuator being controllably drivable to drive the outer surface portion of the fluid material contacting member through a selected range of gap distance relative to the complementary surface of the upstream flow channel; the fluid material having a rate of flow through the flow channel system that varies according to the gap distance.

There is also provided in accordance with the invention a method of controlling fluid flow during an injection cycle in an injection molding machine having a fluid flow distribution system for delivering fluid material to a gate of a mold, the method comprising: injecting fluid through an upstream channel having an axis not intersecting the gate of the mold; regulating the rate of flow of the fluid during the course of the injection cycle at a selected position within the upstream channel according to an algorithm which receives a variable input indicative of a sensed condition of the fluid material sensed by a sensor during the injection cycle; and routing the regulated flow of fluid from the upstream channel to a downstream channel having an axis intersecting the gate of the mold.

In the method, the selected condition of the fluid material can be sensed by the sensor at a position in the flow channel system that is downstream of the selected position in the upstream at which the flow is regulated.

In a preferred embodiment, the method can further comprise regulating the stopping and starting of flow of the fluid material in the injection cycle at a position within the downstream channel. The regulating of the stopping and starting of flow is preferably carried out according to the algorithm based on the variable input indicative of the sensed condition.

BRIEF DESCRIPTION OF THE DRAWINGS

The above and further advantages of the invention may be better understood by referring to the following description in conjunction with the accompanying drawings in which.

DETAILED DESCRIPTION

Figure 1:
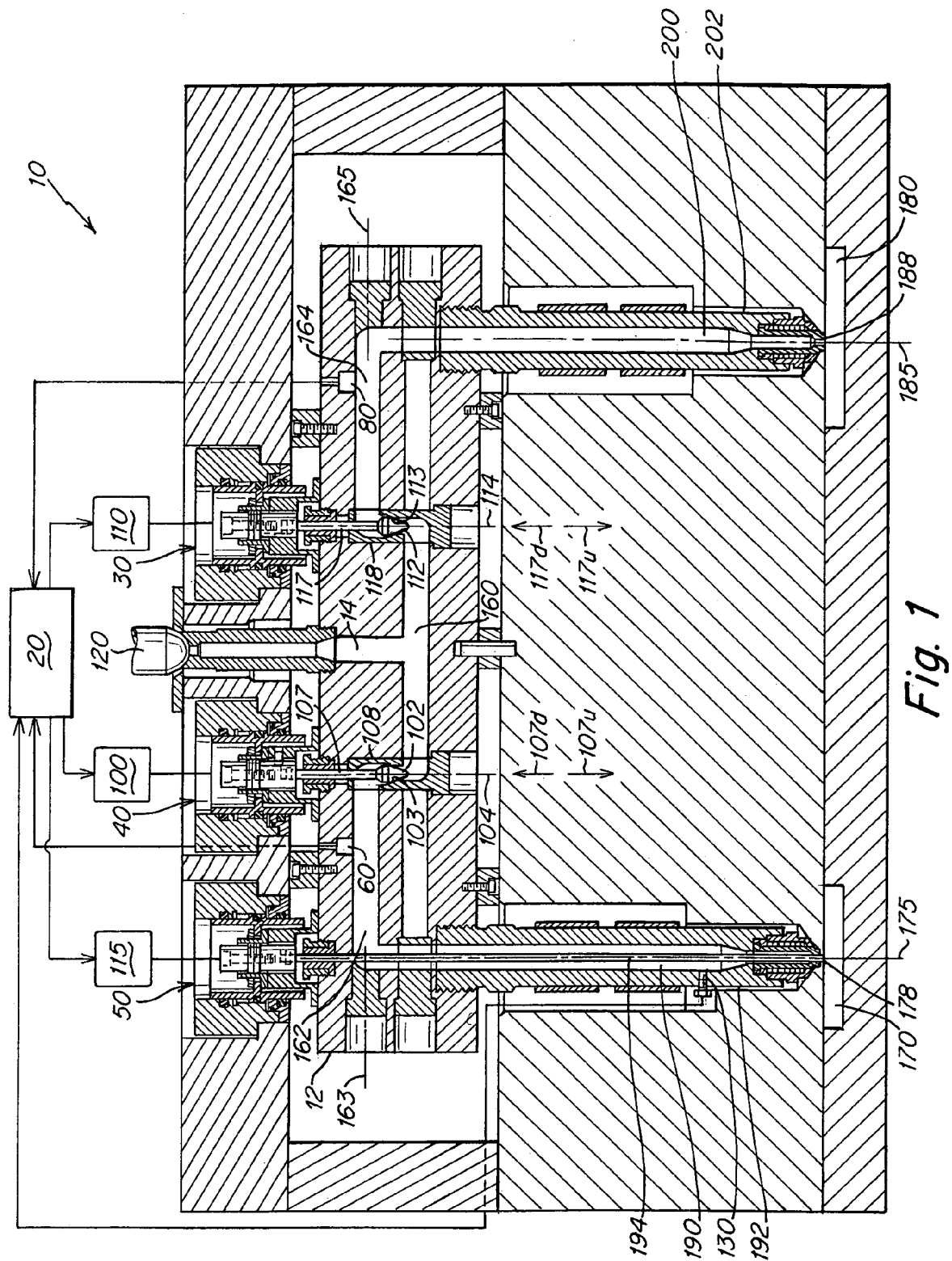
FIG. 1 is a partially schematic cross-sectional view of an injection molding system used in one embodiment of the present invention.
Figure 1A:
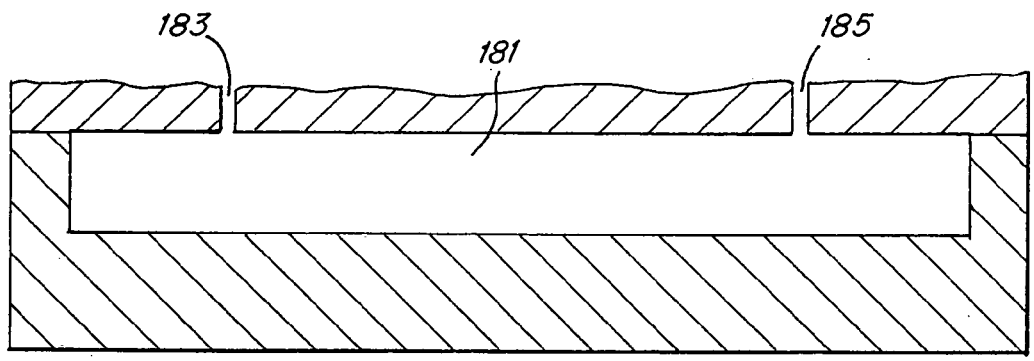
FIGS. 1A-C are schematic representations of gates to a single mold and to molds of different sizes.
Figure 1B:
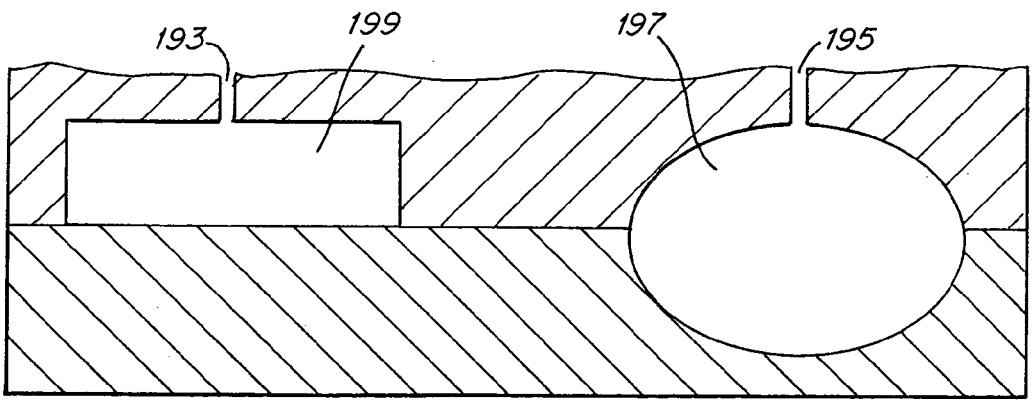
Figure 1C:
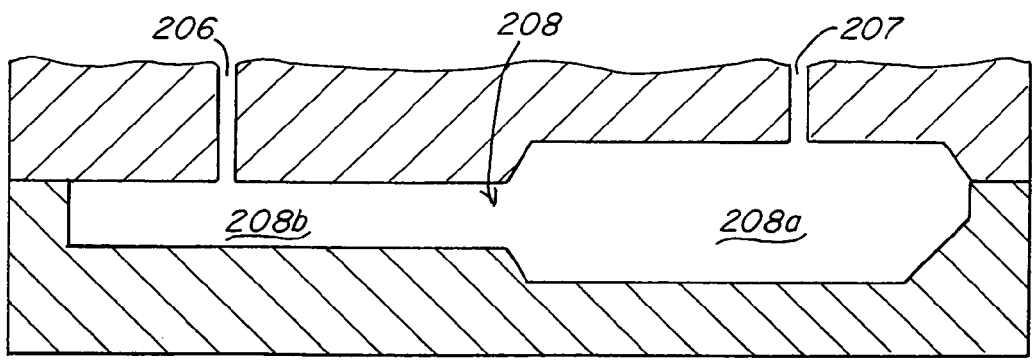

FIG. 1 shows one embodiment of an injection molding system 10 according to the present invention having a valve gated nozzle 192 and a thermal gated nozzle 202 delivering fluid material to gates 178 and 188 respectively, which in turn communicate with and deliver fluid material to mold cavities 170 and 180 respectively. Fluid material is injected initially under pressure from injection molding machine barrel 120 into a main injection channel 14 formed in heated manifold 12 and travels from channel 14 to common upstream feed channel 160. Channel 160 feeds and communicates with downstream channels 162 and 164 having axes 163, 165 via intermediate upstream channels formed within bushings 108, 118 having axes 104, 114 respectively. The intermediate upstream channels or bores formed within upstream bushings 108, 118 communicate with downstream channels 190, 200 respectively via upstream channels 162, 164 as shown. The downstream channels 190, 200 comprise, in part, bores formed within downstream nozzles/bushings 192, 202 respectively that are disposed at the distal most ends of downstream channels 190, 200. The downstream channels 190, 200 have axes 175, 185 respectively that are aligned with and intersect gates 178, 188 respectively. As shown, the upstream channels 162, 164, the upstream channels formed within bushings 108, 118 and the upstream channel 160 all have axes which are offset from the axes of downstream channels 190, 200 are not coaxial with axes 175, 185 and do not intersect gates 178, 188. Although only two nozzles are shown in FIG. 1, the invention contemplates simultaneously controlling the material flow through a plurality of more than two nozzles to a plurality of gates. In the embodiment shown, the injection molding system 10 is a two mold cavity 170, 180 system. The present invention can be adapted to any of a variety of systems where several downstream channels 183, 185 feed a single uniformly dimensioned cavity 181 in a symmetrical arrangement, FIG. 1A, or where several channels 193, 195 feed separate cavities 199, 197 of different size/configuration, FIG. 1B, or where several channels 206, 207 feed a single non-uniform cavity 208 at different locations/points of entry where the volumes to be filled 208a, 208b at entry are different, FIG. 1C.

A system according to the invention is typically used to inject plastic material which is heated/melted to a fluid form and injected through a heated manifold 12 which maintains the plastic material in fluid form. The invention is also applicable to other types of injection systems in which it is useful to control the rate at which another fluid material, e.g., metallic or composite materials is delivered to a cavity of a mold.

The rate at which fluid material is delivered through the channels of the FIG. 1 embodiment is controllably varied by the fluid contacting members 102, 112 which are controllably movable along axes 104, 114 into and out of engagement contact with a complementary mating surface 103, 113, respectively formed within bushings 108, 118. As shown in greater detail in FIG. 2 the fluid contacting member 102 comprises an enlarged bulbous protrusion 102 formed at the distal end of a valve pin 107 which is interconnected at a proximal end to an actuator 40 which is in turn interconnected to a servocontroller 100 which is in turn interconnected to a master controller 20 which typically comprises a computer or other digital data processing mechanism containing a program that executes one or more algorithms that use one or more variables indicative of a signal received from one or more sensors 60, 80, 130 that sense a selected condition of the fluid material flowing through the various channels or bores of the system 10. As shown in the FIG. 1 embodiment, actuator 40, pin 107 and member 102 control fluid flow from common upstream channel 160 to a valve gated downsteam channel 190 while a actuator 30, pin 117, member 112, servomechanism 110 control flow to a thermal gated channel 200.

The master computer or controller 20 receives signal inputs indicative of a fluid material condition from three sensors 60, 80 and 130 in the FIG. 1 system. All of the sensors as shown in FIG. 1 sense a condition of the fluid at a location or position that are downstream of the location at which fluid rate controlling members 102, 112 are positioned. In a preferred embodiment, the algorithm of the computer 20 includes instructions for controlling the movement of actuator 40 and pin 102 to control the rate of fluid flow during an injection cycle through a gap 102g, FIG. 2 that is controllably variable in size via controlled movement of pin 107 along axis 104. The algorithm also includes instruction for controlling the opening and closing of gate 178 during the same injection cycle via controlled movement of pin 195 along axis 175 between gate open and gate closed positions. Pin 195 closes gate 178 off by engagement of the distal end of pin 195 with a complementary receiving aperture at the end of nozzle 192 that communicates with mold cavity 170.

Figure 2:
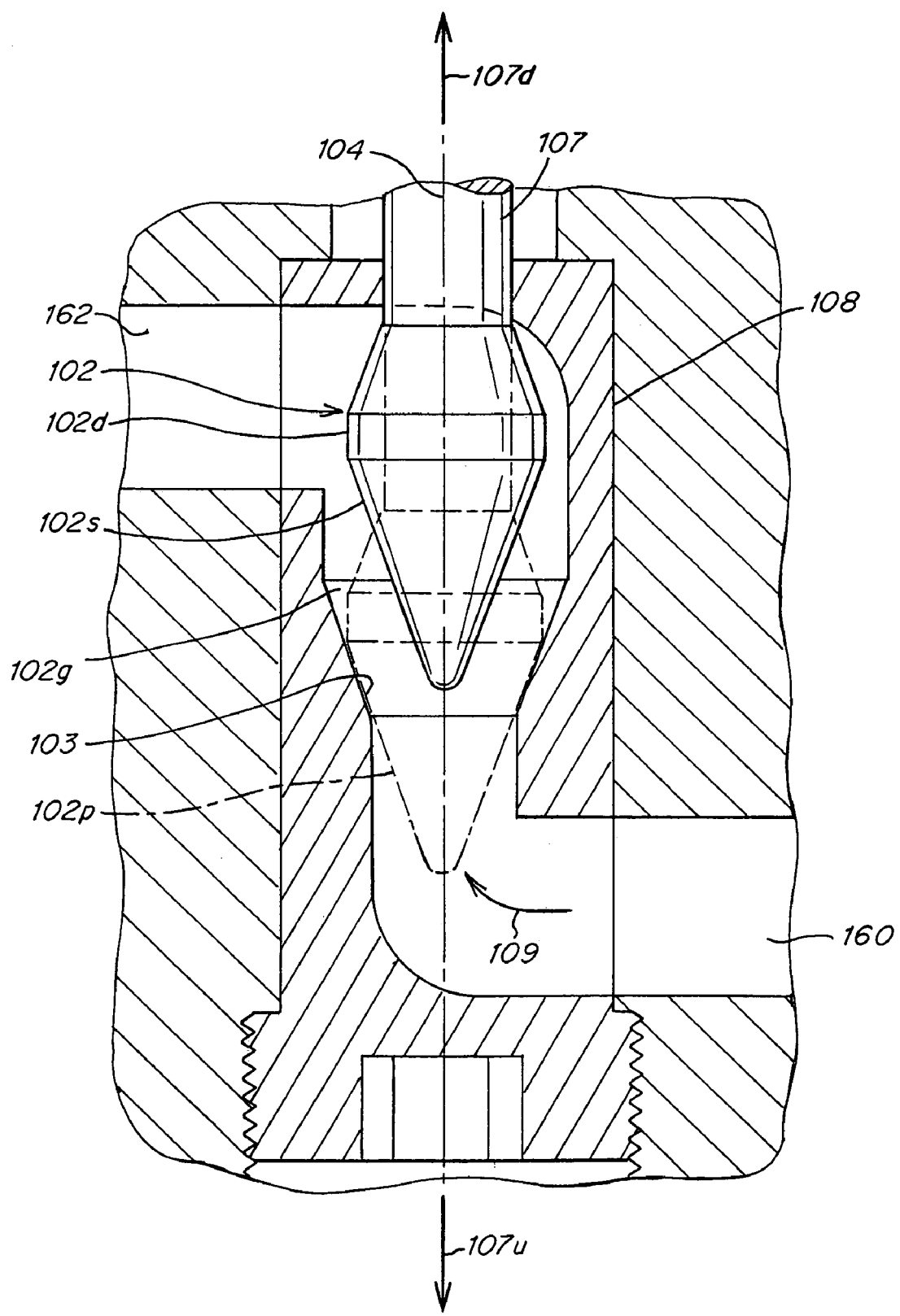
FIG. 2 is an enlarged fragmentary cross-sectional view of the valve pins used as flow contacting and flow rate controlling members in the FIG. 1 system.

As shown in FIG. 2, the fluid contacting member 102 has a surface 102s which is complementary to a mating surface 103 within the flow channel. When the two surfaces mate, i.e. when the member 102 is in the position 102p in dashed lines in FIG. 2, flow is stopped. Between the 102p position and the solid line 102 position shown in FIG. 2, the gap 102g varies in size and the rate of fluid flow varies depending on the size of the gap. In the FIGS. 1, 2 embodiment, the fluid flow rate decreases on forward upstream movement 107u of the valve pin 107 and actuator 40. Conversely, fluid flow rate increases on backward downstream movement 107d of pin 107. Pin 117, member 112, surface 113 and actuator 30 function in the same manner as their analogous components described above on upstream 117u and downstream 117d movement of pin 117, member 112 and actuator 30.

Upstream movement of a fluid contacting member, pin or the like means that the member moves against/in the opposite direction of the flow of the fluid. Downstream movement means that the member moves in the same direction as the flow of fluid. Upstream movement to decrease and/or stop flow rate is preferred, at least when using the pin embodiments of FIGS. 1-5.

Figure 3:
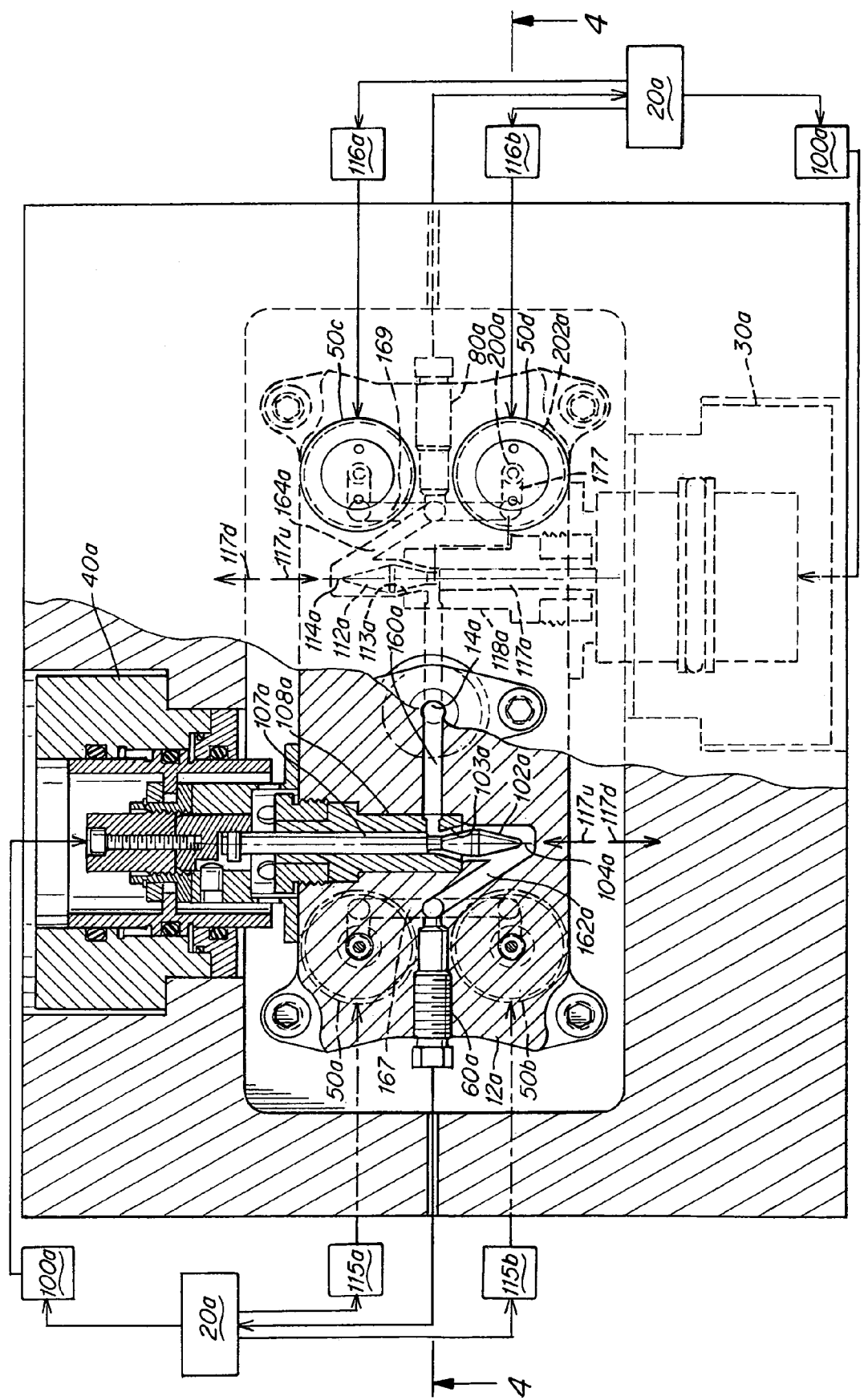
FIG. 3 is a partially schematic, plan sectional view of a system according to the invention.

FIG. 3 shows an embodiment with two upstream channels within bushings 108a, 118a having control pins 107a and 117a respectively. Each of valve pins 108a and 118a separately controls fluid flow rate to a pair of downstream channels and gates (one downstream gate and nozzle shown, 200c, FIG. 4). Each of the downstream gates is controlled by a valve similar to the valve arrangement shown in FIG. 4 for controlling the start and flow stop points of an injection cycle. As shown in FIG. 3 each gate is associated with an actuator 50a, 50b, 50c, 50d which is interconnected to a valve pin such as pin 200a, FIG. 4, which opens and closes a gate, e.g. gate 200c leading to a mold cavity.

Figure 5:
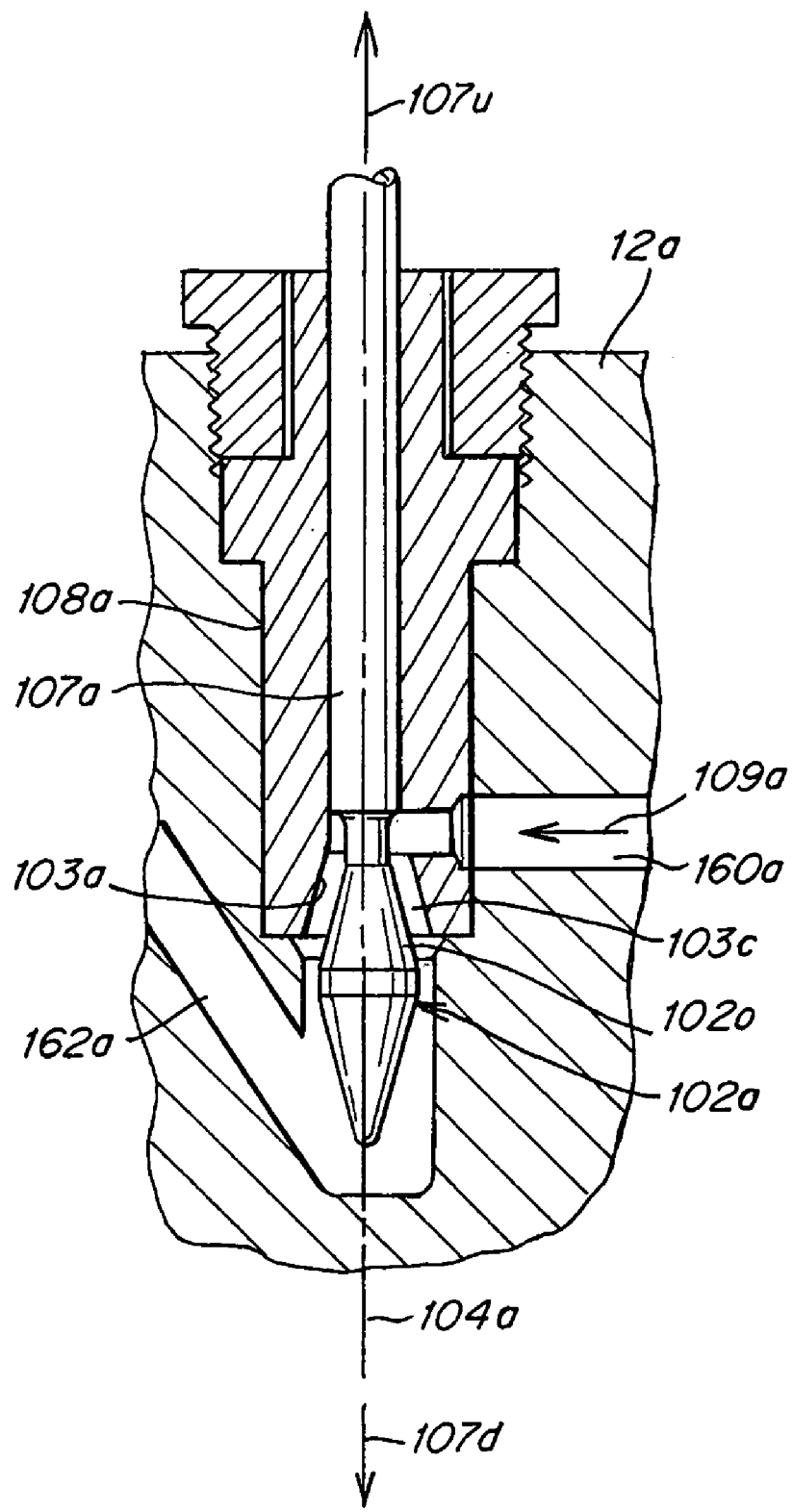
FIG. 5 is an enlarged fragmentary view of the valve pins used as flow contacting and flow rate controlling members in the FIG. 3 system.

Valve pins 107a, 117a are mechanically interconnected to respective hydraulic actuators 40a, 30a which are in turn interconnected to servomechanisms 100a which are in turn controlled by computer 20a. Computer 20a includes an algorithm which utilizes a value indicative of a signal received from downstream sensors 60a, 80a which sense a selected condition of the fluid material at a position downstream of the location of the point of fluid flow rate control, i.e. surfaces 103a, 113a within bushings 108a, 118a. The algorithm controls the operation of actuators 40a, 30a which in turn control axial movement of pins 107a, 117a and their associated enlarged fluid contacting members 102a, 112a within the bores of bushings 108a, 118a. FIG. 5 shows in greater detail a configuration of a fluid contacting member 102a.

Figure 4:
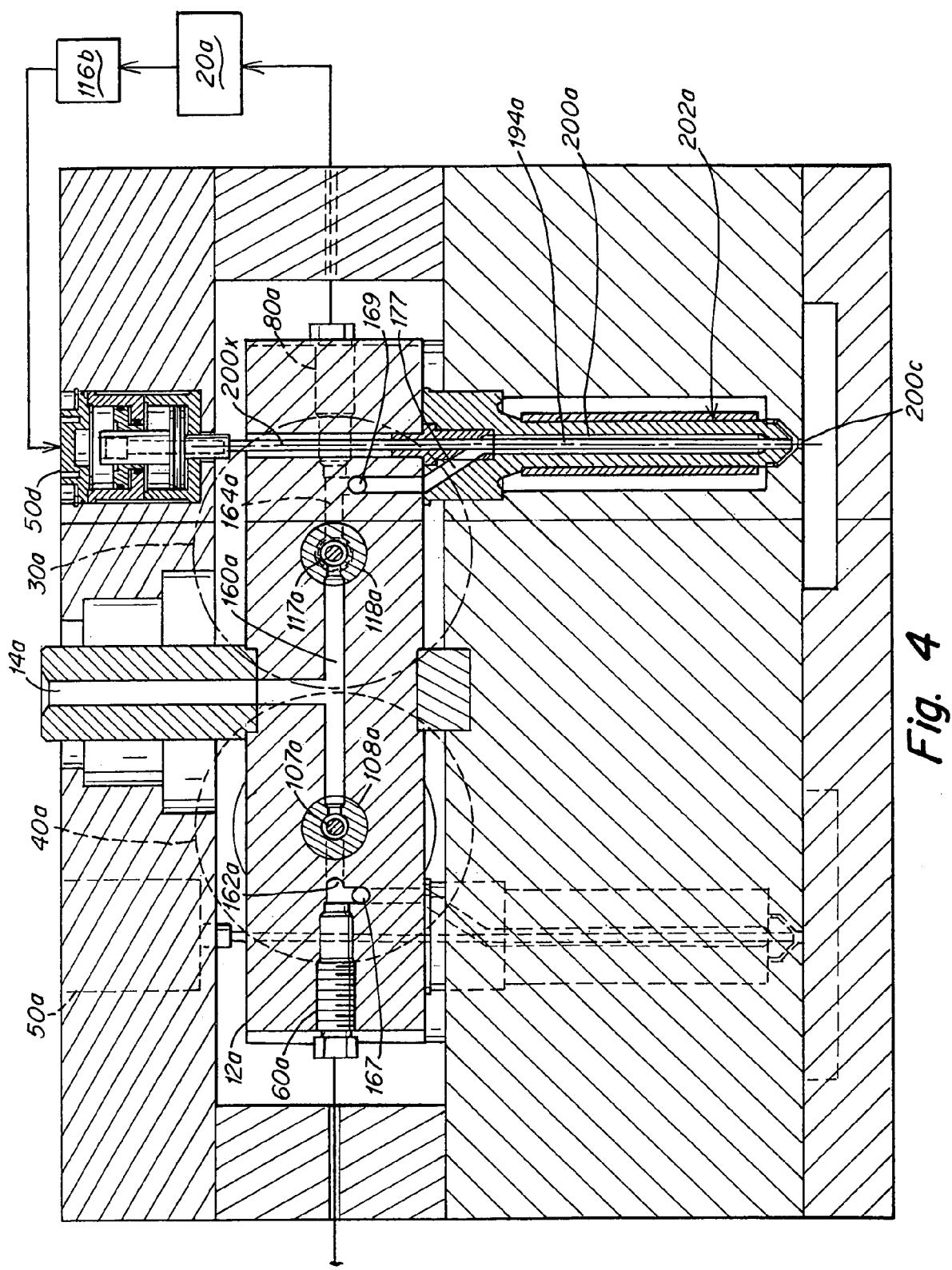
FIG. 4 is a sectional, partially schematic view of the FIG. 3 system.

As shown in FIG. 5, pin 107a is movable in an upstream direction 107u and downstream direction 107d along axis 104a. The upstream movement of pin 107a is accomplished by backward movement of actuator 40a as opposed to forward movement of actuators 40, 30 in the FIG. 1 embodiment. A contoured surface 102o of pin protrusion 102a is configured to be complementary with channel surface 103a such that surfaces 102o and 103a may mate upon complete upstream withdrawal of pin 107a whereby flow is stopped. As shown a gap 103c between surfaces 102o and 103a can be controllably varied in size depending on the position of pin 107a along axis 104a. Upstream movement, 107u, 117u of pins 107a and 117a causes a gap such as gap 103c to decrease in size and thus decrease the rate of fluid flow 109a from common upstream channel 160a to channels 162a, 167. Conversely, downstream movement 107d, 117d of pins 102a, 112a causes the gap, e.g. gap 103c, to increase in size and thus increase fluid flow rate. As shown, main barrel channel 120 feeds upstream channel 160a which commonly feeds the bores or channels within bushings 108a, 118a. The flow from bushings 108a, 118a feeds intermediate downstream channels 162a, 164a which feed intermediate channels 167, 169. Intermediate downstream channels 167, 169 commonly feed the bores/channels associated with actuators 50a-d, e.g. bore 200a, FIG. 4, all of which have an axis, e.g. 200x, which intersect and lead to gates, e.g. gate 200c, and their associated mold cavities. As shown in FIG. 4, common feed channel 169 communicates with a lateral channel 177 provided in bushing 202a which communicates with the bore/channel 200a within bushing 202a.

In both of the embodiments of FIGS. 1, 2 and FIGS. 3-5, the rate of flow is decreased by upstream movement of the fluid contacting member and increased by downstream movement. As shown, the position at which fluid flow rate is controlled is located within a channel, having an axis, e.g. 104a, 114a, FIG. 4, which is not coaxial with the downstream channels having an axis that intersects a gate leading to a mold, e.g. channel 200a having axis 200x intersecting gate 200c, FIG. 4.

Figure 6:
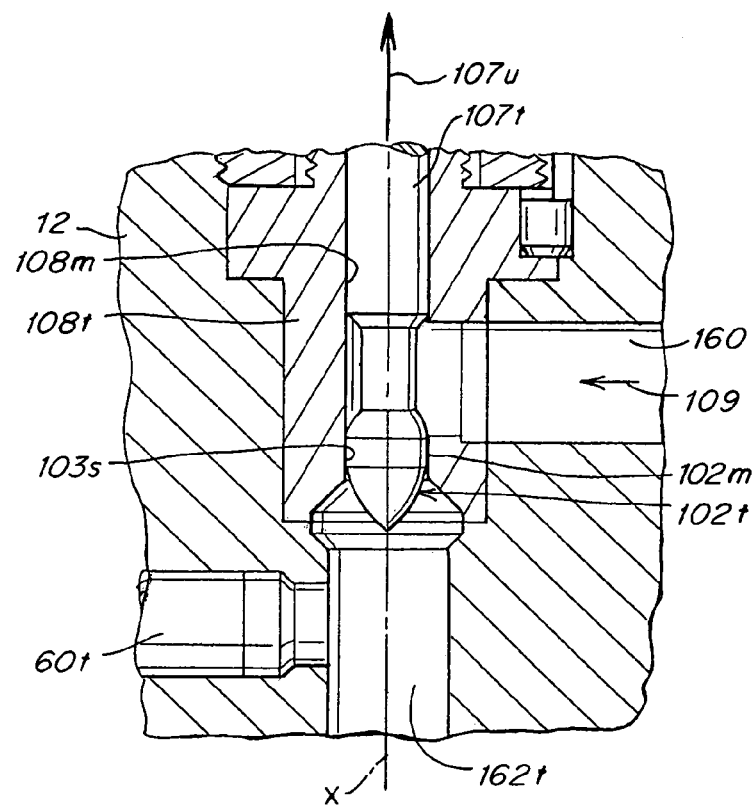
FIGS. 6-8 are enlarged, fragmentary views of an alternative valve pin usable as a flow contacting and flow rate controlling member in the FIG. 1 and FIG. 3 systems.
Figure 7:
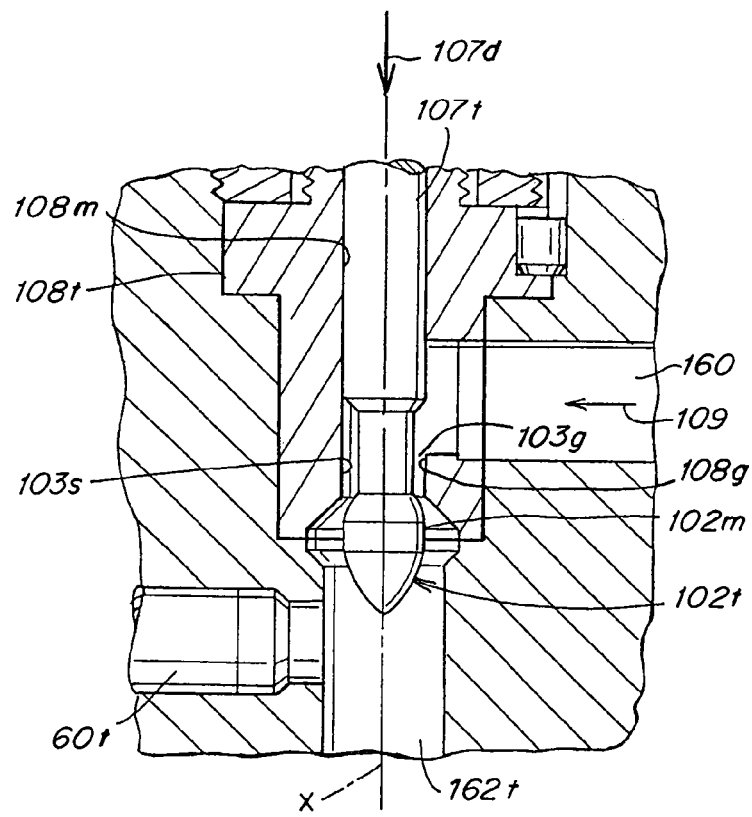
Figure 8:
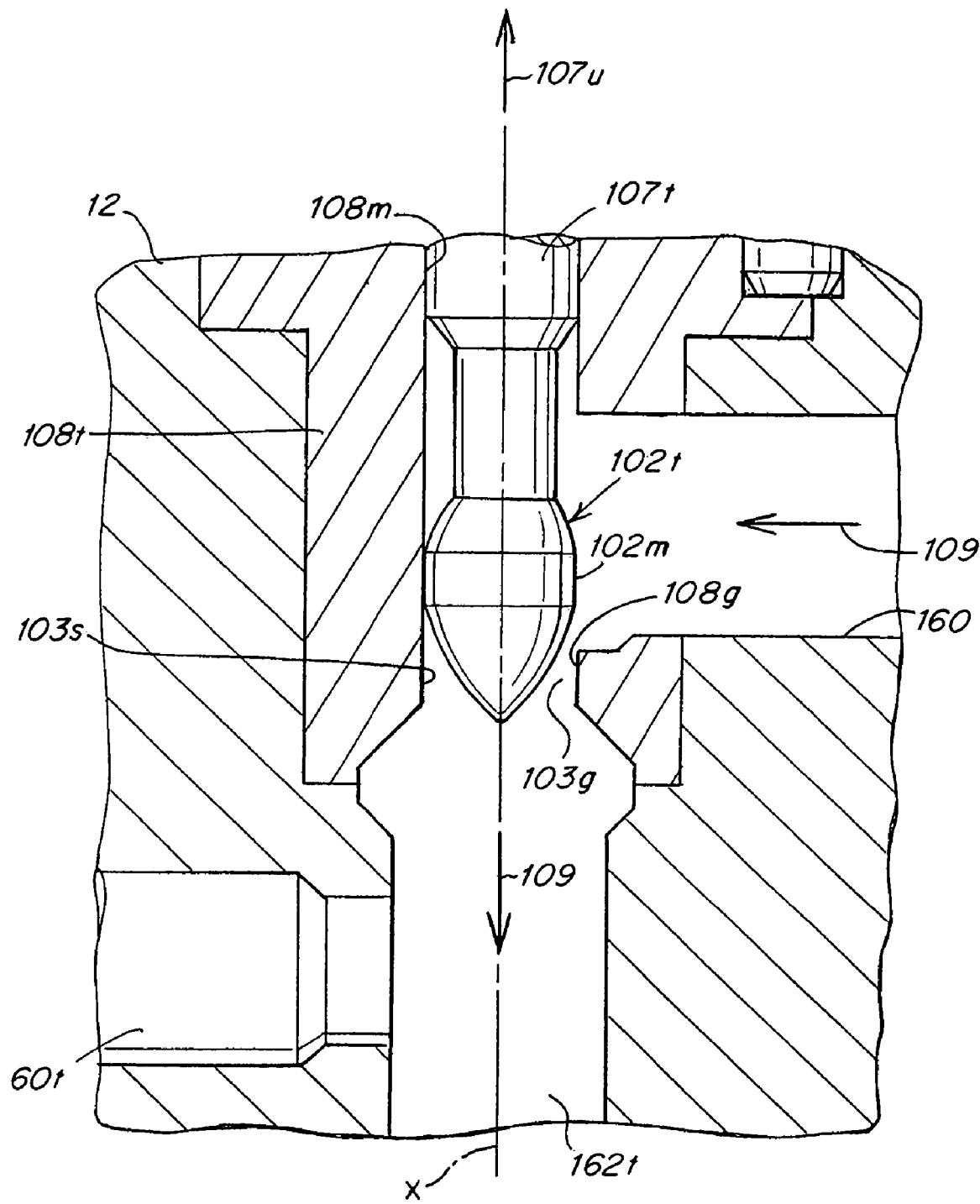

FIGS. 6-8 show an alternative melt flow controller embodiment for use in the invention. As shown, pin 107t is slidably mounted in a mounting channel 108m having a diameter equal to the maximum diameter of midsection, 102m of the fluid contacting member 102t such that the pin 107t can be entirely withdrawn in the direction 107u from the manifold and bushing 108t and readily replaced without disassembling any portion of the manifold or bushing 108t. The maximum diameter midsection 102m has the same diameter as the complementary flow restricting throat surface 103s of the bushing 108t such that when the two surfaces mate flow is stopped. As shown in FIGS. 7 and 8, the rate of flow and the size of the flow rate determining gap 103g can be controllably varied by either upstream movement 107u, FIG. 8 or downstream movement, 107d, FIG. 7 of pin 107t. Upstream movement 107u can form gap 103g between bushing surface 108g, FIG. 8, and the lower outer surface of member 102t. Downstream movement 107d, FIG.

7, can also form a gap 103g between channel surfaces 103s, 108g and the upper portion of the outer surface of member 102t. As described above, controlled movement of pin 107t by computer 20 controls the size of the gap 103g and thus the rate of flow from upstream channel 160 to downstream channel 162t which leads to downstream channel 190 or 200 or the like. Axis x as shown in FIGS. 6-8 corresponds to axis 104 of FIG. 1 and is not coaxial with axis 175 of the downstream bore 190 leading to a gate such as 175.

In the embodiments shown, a pressure sensor is typically used to sense the pressure of the fluid material in the channel locations shown downstream of the upstream flow control members. In operation, the conditions sensed by the pressure transducer associated with each channel are fed back to a control system that typically includes PID algorithmic controllers (proportional, integral, derivative). The computer 20 typically executes a proportional, integral, derivative algorithm which compares the sensed pressure (at a given time) from the pressure transducer to a programmed target pressure (for the given time). The computer 20 instructs the PID controller to adjust the position of the flow controller or valve pin using the actuators in order to mirror the target pressure for that given time. In this way a programmed target pressure or profile of pressure versus time (described in detail below) for an injection cycle for a particular part for each downstream channel or gate can be followed by the computer or controller 20.

As to each separate downstream channel leading to a gate, the target pressure or pressure profile may be different, particularly where the channels are injecting into separate cavities, and thus separate algorithms or programs for achieving the target pressures at each nozzle may be employed. As can be readily imagined, a single computer or CPU may be used to execute multiple programs/algorithms for each channel leading to a gate or separate computers may be utilized.

Other sensed conditions can be used which relate to melt flow rate other than pressure. For example, the position of a melt flow controller or valve pin or the load on the valve pin could be the sensed condition. If so, a position sensor or load sensor, respectively, could be used to feed back the sensed condition to the PID controller.

The embodiments described control the rate of melt flow away from the gate along a channel axis offset from a channel having an axis intersecting and leading to a gate thus enabling control of flow rate to multiple channels intersecting multiple gates. Controlling the melt flow away from the gate also enables a pressure or other material condition sensor to be located away from a gate.

In practical operation, a target profile of the condition of the fluid material over the period of time of an injection cycle is created for each downstream channel where a sensor is located. To create a target profile for a particular and the mold cavity associated therewith, the injection molding machine is first set at maximum injection pressure and screw speed, and parameters relating to the injection pressure, injection time, pack and hold pressure and pack and hold time are set on the computer 20 at values that the molder estimates will generate good parts based on part size, shape, material being used, experience, etc. Trial and error Injection cycles are run for the selected channels and their associated, e.g. for channels 190, 200 and their associated mold cavities 170, 180, with alterations being made to the above parameters depending on the condition of the parts to be produced. When the most satisfactory parts are produced during a trial injection cycle run, the profile of fluid material condition that produced the most satisfactory parts is determined for those particular channels or nozzle bores and the cavities associated therewith. This process is repeated for all channels in which a sensor is mounted until target fluid condition profiles are ascertained for each channel having a sensor and cavity associated therewith. Preferably, the predetermined ideal target profiles are stored in computer 20 and used by the computer for controlling servomechanisms 100, 110 and 115 during actual production injection cycles.

The foregoing process of ideal profile creation can be used with any number of channels having a sensor. Although it may be preferable to profile one channel and associated cavity at a time (while the other channels are closed) in a "family tool" mold application, the target profiles can also be created by running all channels simultaneously, and similarly adjusting each channel profile according to the quality of the parts produced. This would be preferable in an application where all the channels are injecting into like cavities, since the profiles should be similar, if not the same, for each channel and its associated cavity.

In single cavity applications (where multiple channels from a manifold are injecting into a single cavity), the target profiles can also be created by running the channels at the same time and adjusting the profiles for each channel according to the quality of the part being produced.

Figure 9A:
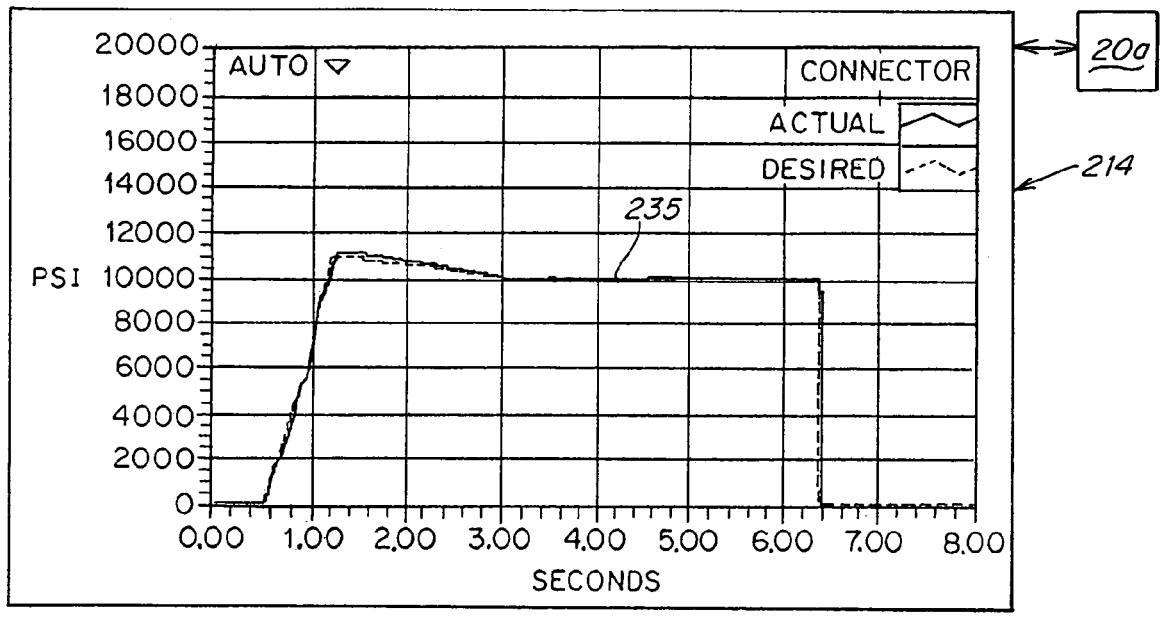
FIGS. 9a, 9b, 10, 11 are examples of displays that can be displayed on a user interface, the user interface being interconnected to a master computer controller as shown and described with reference to the FIGS. 1, 3 embodiments.
Figure 9B:
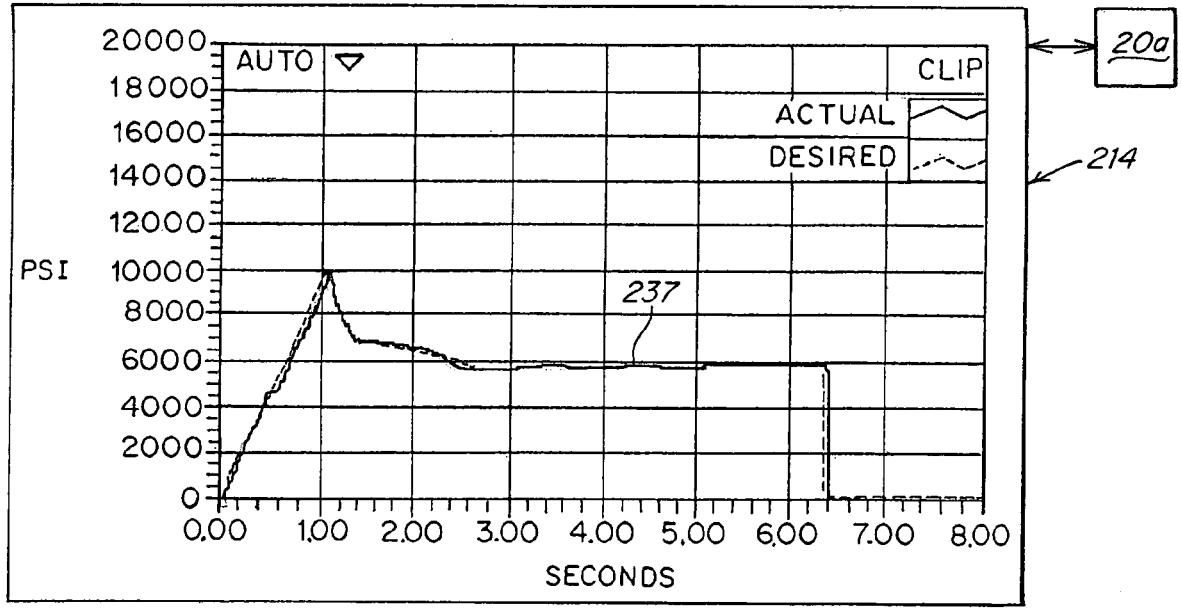

The system can be implemented using a user interface 214, FIGS. 9a-b in which each target profile can be stored, displayed and sent as an input to the algorithm to be executed by the computer/controller 20. Alternatively the profile data can be input to and stored directly in the computer without the interface.

FIGS. 9a-b show one example of pressure versus injection cycle time graphs (235, 237) of the pressure detected by the two pressure transducers 60a, 80a associated with the two channels 167, 169. The graphs of FIGS. 9a-b are generated and/or displayed on the user interface 214 so that a user can observe the tracking of the actual pressure during an actual injection cycle versus the target pressure during the course of an actual injection cycle in real time, or after the cycle is complete. The two different graphs of FIGS. 9a and 9b show two independent target pressure profiles ("desired") emulated by the two channels 167, 169. Different target profiles may be desirable to uniformly fill different sized mold cavities associated with each channel that is associated with actuators 50a-d, or to uniformly fill different sized sections of a single cavity. Profiles such as these can be generated with respect to any embodiments of the invention.

The melt flow controller, 102a associated with graph 235 is opened sequentially at 0.5 seconds after the melt flow controller 112a associated with graph 237 is opened at 0.00 seconds. During injection (for example, 0.00 to 1.0 seconds in FIG. 9b) and pack and hold (for example, 1.0 to 6.25 seconds in FIG. 9b) portions of the graphs, each melt flow controller 102a, 112a (or fluid contacting member) is controllably moved to a plurality of positions to alter the pressure sensed by the pressure transducers 60a, 80a to track the target pressure profiles.

Through the user interface 214, target profiles can be designed, and changes can be made to any target profile using standard windows-based editing techniques.

The profiles are then used by computer 20 to control the actuators 50a-d and thus control the position of the valve pins 107a and 117a. For example, FIG. 10 shows an example of a profile creation and editing screen icon 300 generated on interface 214.

Screen icon 300 is generated by a windows-based application performed on interface 214. Alternatively, this icon could be generated on an interface associated with controller 20. Screen icon 300 provides a user with the ability to create a new target profile or edit an existing target profile for any given nozzle and cavity associated therewith.

Figure 10:
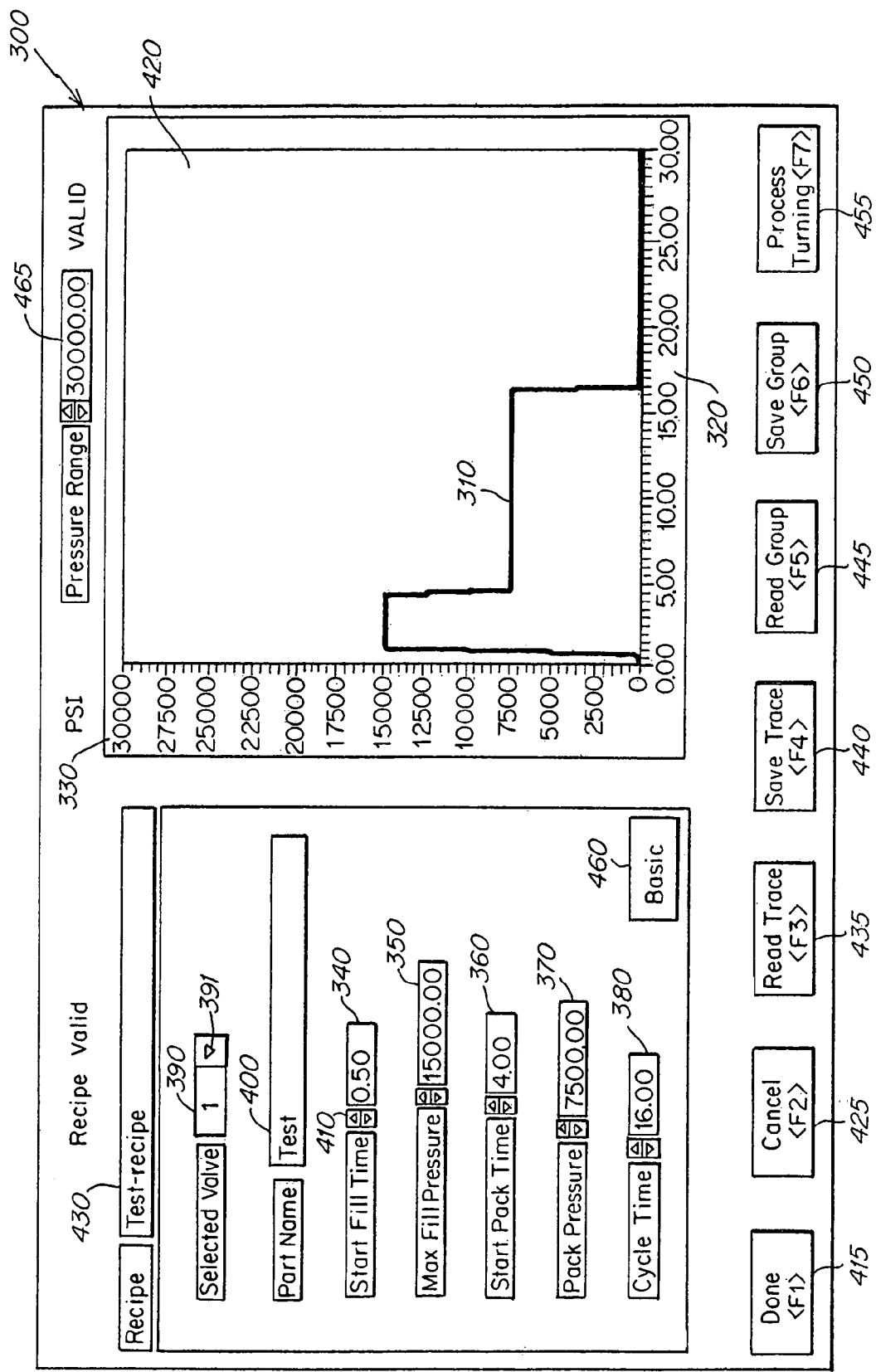

A profile 310, FIG. 10, includes (x, y) data pairs, corresponding to time values 320 and pressure values 330 which represent the desired pressure sensed by the pressure transducer for the channel being profiled. The screen icon shown in FIG. 10 is shown in a "basic" mode in which a limited group of parameters are entered to generate a profile. For example, in the foregoing embodiment, the "basic" mode permits a user to input start time displayed at 340, maximum fill pressure displayed at 350 (also known as injection pressure), the start of pack time displayed at 360, the pack and hold pressure displayed at 370, and the total cycle time displayed at 380.

The screen also allows the user to select the particular melt flow controller they are controlling displayed at 390, and name the part being molded displayed at 400. Each of these parameters can be adjusted independently using standard windows-based editing techniques such as using a cursor to actuate up/down arrows 410.

By clicking on a pull-down menu arrow 391, the user can select different channel melt flow controllers in order to create, view or edit a profile for the selected channel and cavities associated therewith. Also, a part name 400 can be entered and displayed for each selected channel flow controller.

The newly edited profile can be saved in computer memory individually, or saved as a group of profiles for a group of channels that inject into a particular single or multicavity mold. The term "recipe" is used to describe a group of profiles for a particular mold and the name of the particular recipe is displayed at 430 on the screen icon.

To create a new profile or edit an existing profile, first the user selects a particular channel for the particular recipe being profiled. The flow controller selection is displayed at 390. The user inputs an alpha/numeric name to be associated with the profile being created, for family tool molds this may be called a part name displayed at 400. The user then inputs a time displayed at 340 to specify when injection starts. A delay can be with particular channel controllers to sequence the opening of the valves and the injection of melt material into different gates of a mold.

The user then inputs the fill (injection) pressure displayed at 350. In the basic mode, the ramp from zero pressure to max fill pressure is a fixed time, for example, 0.3 seconds. The user next inputs the start pack time to indicate when the pack and hold phase of the injection cycle starts. The ramp from the filling phase to the packing phase is also fixed time in the basic mode, for example, at about 0.3 seconds.

The final parameter is the cycle time which is displayed at 380 in which the user specifies when the pack and hold phase (and the injection cycle) ends. The ramp from the pack and hold phase to zero pressure at about 16.5 seconds will be instantaneous when a valve pin (e.g. 195) as in the FIGS. 1-5 embodiments is used to close a gate, or slower in a thermal gate (e.g. FIG. 1, nozzle 202) due to the residual pressure in the cavity which will decay to zero pressure once the part solidifies in the mold cavity. The "cool" time typically begins upon the drop to zero pressure and lasts to the end of the cycle, e.g. 16.5-30.0 seconds in FIG. 10.

User input buttons 415 through 455 are used to save and load target profiles.

Button 415 permits the user to close the screen. When this button is clicked, the current group of profiles will take effect for the recipe being profiled. Cancel button 425 is used to ignore current profile changes and revert back to the original 30 profiles and close the screen. Read Trace button 435 is used to load an existing and saved target profile from memory. The profiles can be stored in memory contained in the interface 215 or the controller 210. Save trace button 440 is used to save the current profile. Read group button 445 is used to load an existing recipe group. Save group button 450 is used to save the current group of target profiles for a group of flow controllers. The process tuning button 455 allows the user to change the PID settings (for example, the gains) for a particular channel valve in a control zone. Also displayed is a pressure range 465 for the injection molding application.

Figure 11:
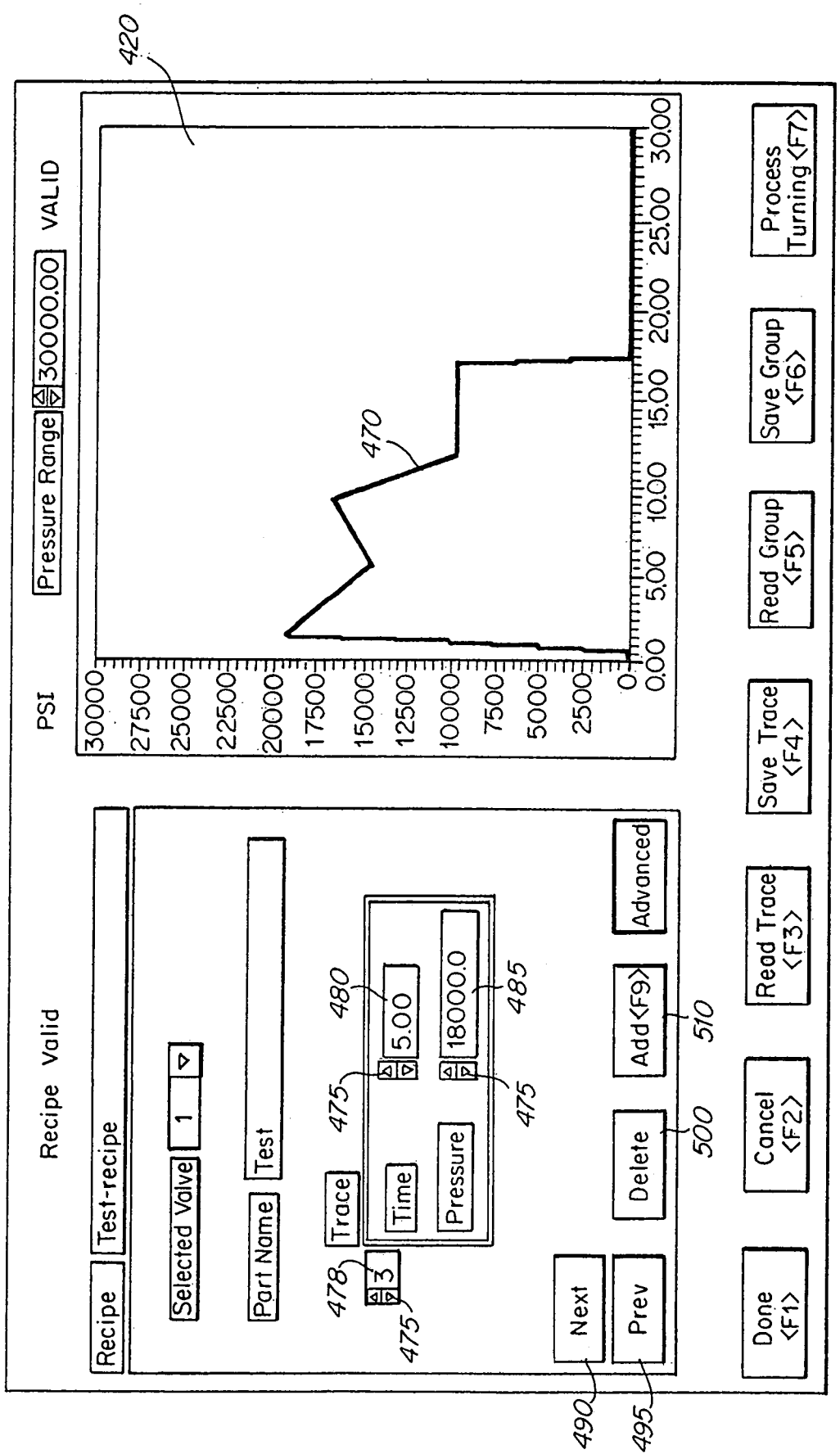

Button 460 permits the user to toggle to an "advanced" mode profile creation and editing screen. The advanced profile creation and editing screen is shown in FIG. 11.

The advanced mode allows a greater number of profile points to be inserted, edited, or deleted than the basic mode. As in the basic mode, as the profile is changed, the resulting profile is displayed.

The advanced mode offers greater profitability because the user can select values for individual time and pressure data pairs. As shown in the graph 420, the profile 470 displayed is not limited to a single pressure for fill and pack/hold, respectively, as in the basic mode. In the advanced mode, individual (x, y) data pairs (time and pressure) can be selected anywhere during the injection cycle.

To create and edit a profile using advanced mode, the user can select a plurality of times during the injection cycle (for example 16 different times), and select a pressure value for each selected time. Using standard windows-based editing techniques (arrows 475) the user assigns consecutive points along the profile (displayed at 478), particular time values displayed at 480 and particular pressure values displayed at 485.

The next button 490 is used to select the next point on the profile for editing. Prev button 495 is used to select the previous point on the profile for editing. Delete button 500 is used for deleting the currently selected point. When the delete button is used the two adjacent points will be redrawn showing one straight line segment.

The add button 510 is used to add a new point after the currently selected point in which time and pressure values are entered for the new point. When the add button is used the two adjacent points will be redrawn showing two segments connecting to the new point.

Sensors which detect properties other than pressure may be employed. Preferably, sensors are used which detect a property of the fluid or of the operation of the mechanisms that control fluid flow rate. Data indicative of flow rate typically comprises a fluid property that is readily correlatable to or convertible by an algorithm to the time or rate of filling of the mold cavity. Fluid pressure leading to or through an injection port is one example of flow rate data. The position of a mechanical flow controller mechanism such as a valve pin, rotary valve, plunger or ram; the position of an actuator that can be used to control movement of a pin, rotary valve, plunger or ram; the force or pressure exerted by an actuating mechanism (e.g. hydraulic, pneumatic actuator), electric motor, ram or the like; the electrical power or hydraulic or pneumatic pressure that is used to drive an actuating mechanism, motor, ram or the like during an injection cycle are other examples of data that a sensor can record and be converted to a variable for input to an algorithm executable by a computer 20, 20a for controlling the movement of a melt flow controller or fluid contacting member.

Following is a list of exemplary flow rate indicative parameters that a sensor can be used to detect for use in the invention:

position of a flow controlling valve pin or actuator cylinder;

force or pressure exerted on or by a flow controlling valve pin, actuator cylinder, ram, screw or motor;

energy or power used to operate a flow controlling actuator, ram, motor or the like;

flow rate recorded by a mechanical, optical or electronic sensing flowmeter;

flow volume injected over time by a machine ram/screw;

velocity of movement of a flow controlling component such as valve pin, alternative ram, plunger, rotary valve or the like.

As described with respect to the FIGS. 9-11 profile of fluid pressure data, a similar profile of data for any of the above variables over the time of an injection cycle may be obtained by trial and error running of an injection molding apparatus and then used as a target profile to be emulated by an algorithm to control the movement of a melt flow controller during an injection cycle.

Figure 12:
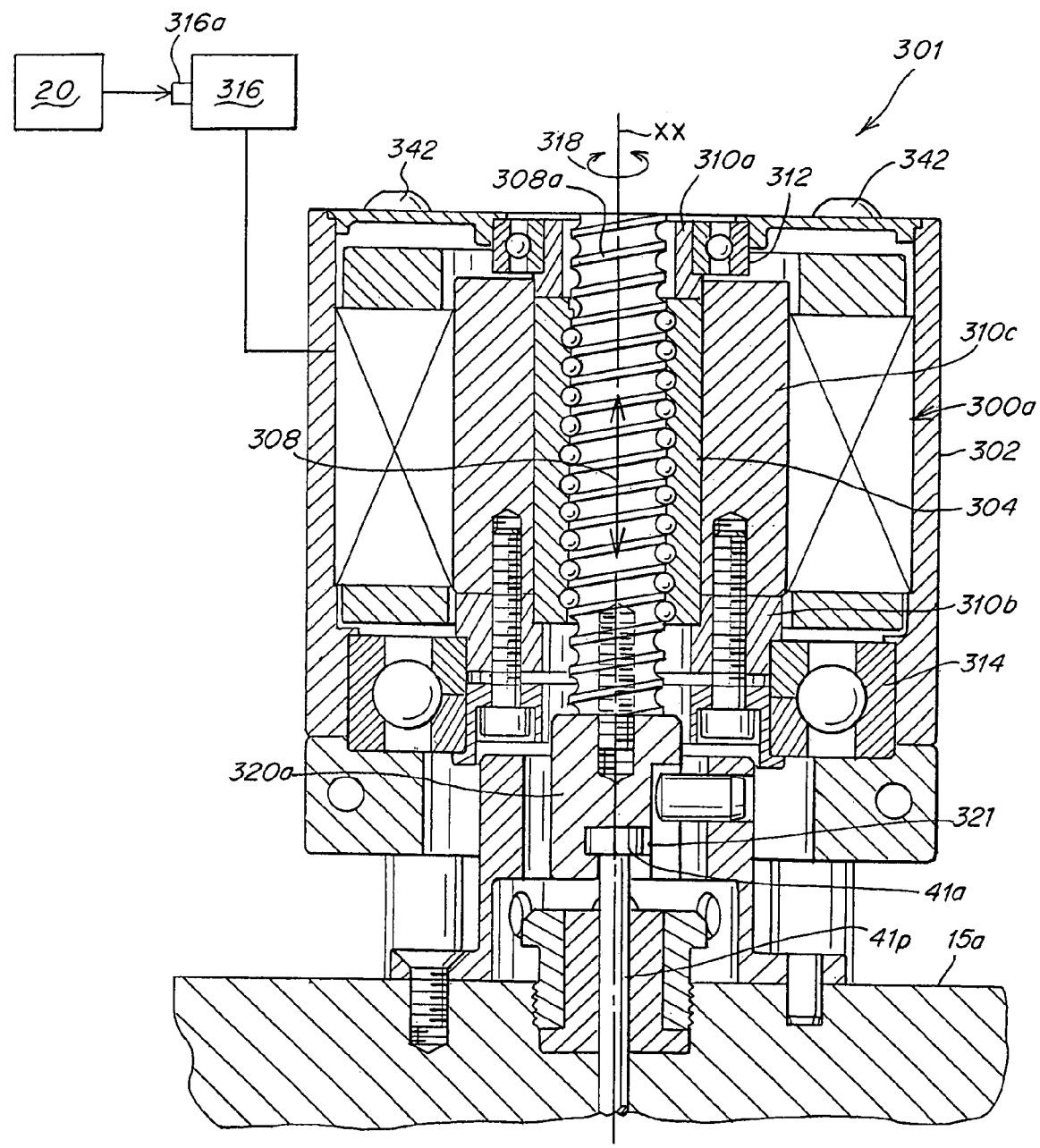
FIG. 12 is a side cross-sectional view of a shaftless motor for use as an alternative actuator for flow control mechanism in accordance with the invention, the motor having an axially movable screw for driving the flow controller; and, FIG. 13 is a schematic side cross-sectional view of a rotary valve flow controller system.

FIG. 12 shows an example of an electrically powered motor which may be used as an actuator 301, in place of a fluid driven mechanism (such as 30, 40, 30a, 40a, FIGS. 1, 3) for driving a valve pin or rotary valve or other nozzle flow control mechanism. In the embodiment shown in FIG. 12 a shaftless motor 300a mounted in housing 302 has a center ball nut 304 in which a screw 306 is screwably received for controlled reciprocal driving 308 of the screw 308a along axis XX. Other motors which have a fixed shaft in place of the screw may also be employed as described more fully in U.S. application Ser. No. 09/187,974, the disclosure of which is incorporated herein by reference. As shown in the FIG. 12 embodiment the nut 304 is rigidly interconnected to magnet 310c and mounting components 310a, 310b which are in turn fixedly mounted on the inner race of upper rotational bearing 312 and lower rotational bearing 314 for rotation of the nut 304 relative to housing 302 which is fixedly interconnected to the manifold 15a of the injection molding machine. The axially driven screw 308a is fixedly interconnected to valve pin 41 which reciprocates 308 along axis X together with screw 308a as it is driven. As described more fully below, pin 41 is preferably readily detachably interconnected to the moving component of the particular actuator being used, in this case screw 308a. In the FIG. 22 embodiment, the head 41a of pin 41p is slidably received within a complementary lateral slot 321 provided in interconnecting component 320a. The housing 302 may be readily detached from manifold 15a by unscrewing bolts 324 and lifting the housing 302 and sliding the pin head 41a out of slot 321 thus making the pin readily accessible for replacement.

As can be readily imagined other motors may be employed which are suitable for the particular flow control mechanism which is disposed in the flow channel of the manifold or nozzle, e.g. valve pin or rotary valve. For example, motors such as a motor having an axially fixed shaft having a threaded end which rotates together with the other rotating components of the actuator 301 and is screwably received in a complementary threaded nut bore in pin interconnecting component 320, or a motor having an axially fixed shaft which is otherwise screwably interconnected to the valve pin or rotary valve may be employed.

Controlled rotation 318 of screw 308a, FIG. 22, is achieved by interconnection of the motor 300a to a motor controller 316 which is in turn interconnected to the CPU, the algorithm of which (including PID controllers) controls the on/off input of electrical energy to the motor 300a, in addition to the direction and speed of rotation 318 and the timing of all of the foregoing. Motor controller 316 may comprise any conventional motor control mechanism(s) which are suitable for the particular motor selected. Typical motor controllers include an interface 316a for processing/interpreting signals received from the computer 20 similar to the interface 214 described with reference to FIGS. 9-11; and, the motor controllers typically comprise a voltage, current, power or other regulator receiving the processed/interpreted signals from interface 316a that regulates the speed of rotation of the motor 300 according to the instruction signals received from computer 20.

Figure 13:
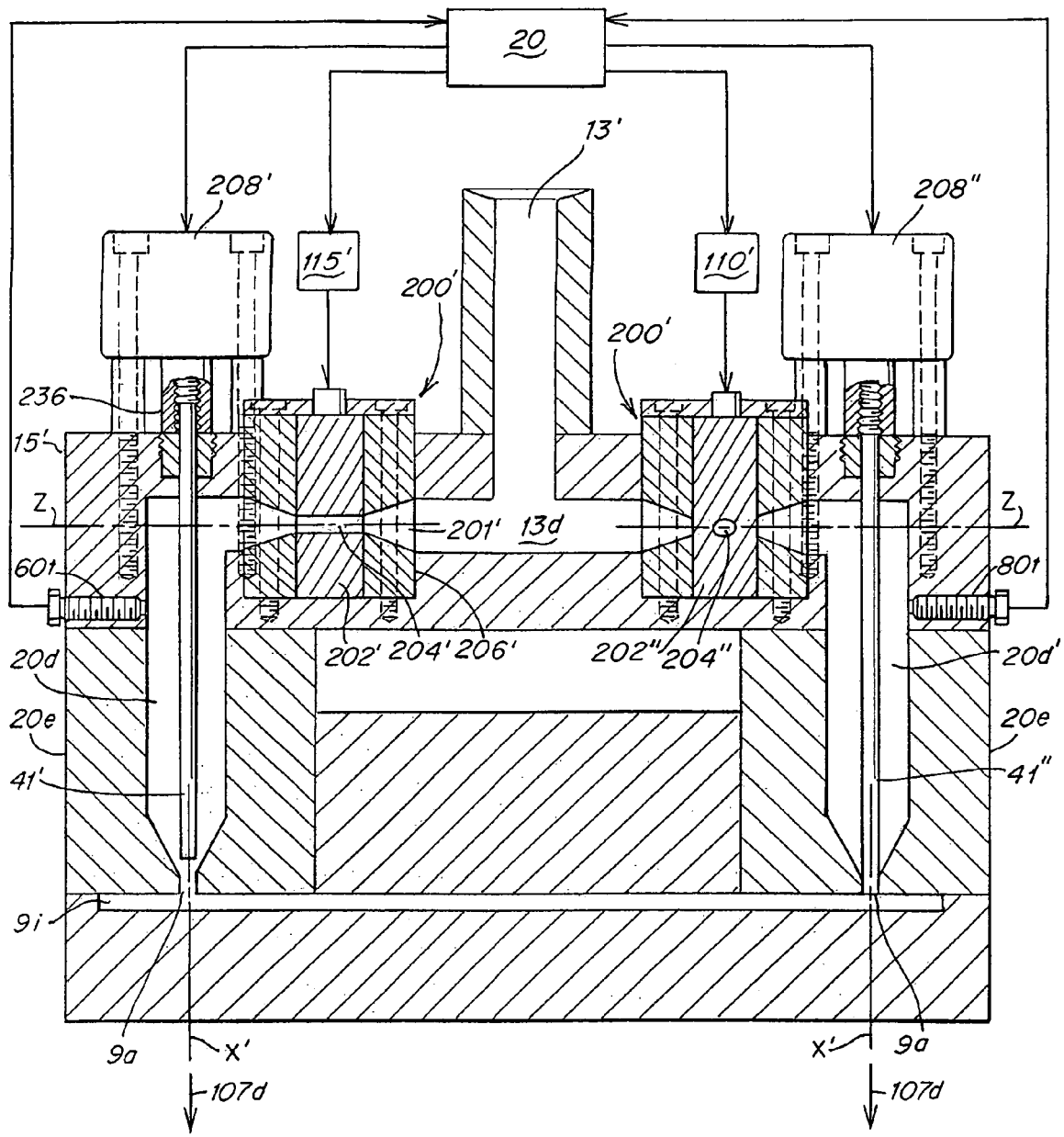

FIG. 13 shows a pair of rotary valve flow controllers 200' mounted in a heated manifold 15' for distribution of fluid material from a main barrel injection channel 13' to a common upstream distribution channel 13d having an axis Z to downstream channels 20d having an axis X' that intersects the gates 9a of mold cavity 9i. As shown in FIG. 13, the axis Z of upstream channel 13d is not coaxial with the axis X' of downstream channels 20d. The rotary valves 200' are disposed within the off axis channel 13d for controlling flow rate based on variables indicative of sensor signals sent by downstream sensors 60t, 80t and received in some form by master computer controller 20 for use in a control algorithm. As shown in schematic form in FIG. 13, the rotary valves comprise a housing 206' in which a plug 202' is rotatably mounted. The plug has a central flow channel or bore 204' which is rotatably alignable with feed bores 201' provided within the body of housing 206'. Depending on the degree of rotational alignment of plugs 202' and channels 204' with housing bores 201', fluid will flow at a variable rate from channel 13d through channels 204' into non-coaxial downstream channels/bores 20d which lead to gates 9a. Plugs 202' are rotatable to a selected degree by drive mechanisms or actuators 110', 115'. Typically actuators 110', 115' comprise electric motors or electrically powered actuators but can comprise any suitable actuator for effecting rotation of plugs 202'. The actuators 110', 115' are interconnected to and receive command signals from computer controller 20 which contains a control algorithm as described above for controlling the degree of rotation of plugs 202' and thus the rate of fluid flow during an injection cycle in the same manner as described with reference to the FIGS. 1-12 embodiments. As shown in FIG. 13, bore 204' is in a fully aligned, full open flow rotational position with respect to downstream channel 20d wherein bore 204', actuator 115' and 208' are at an intermediate point in an injection cycle which is in operating to regulate fluid flow; and, as shown in FIG. 13, bore 204" is in a fully not aligned, flow stop rotational position with respect to downstream channel 20d wherein bore 204", actuator 110' and 208' are at either a cycle end/stop or cycle point in an injection cycle where flow is stopped.

Sensors 60t and 80t are mounted downstream of the rotary valves 200' and provide the fluid material condition data as variable inputs to the algorithm of computer 20 in the same manner as described above to control the operation of actuators 110', 115' during an injection cycle. As shown in FIG. 13, downstream channels 20d include actuators 208' and valve pins 41', 41". Valve pins 41', 41" are interconnected to actuators 208' for reciprocal movement along axes X' between open flow and closed flow positions wherein the distal ends of the valve pins 41', 41" close off the downstream channels 20d at gate 9a when moved to their fully downstream direction by actuators 208 at the end of an injection cycle. As shown in FIG. 13, valve pin 41" is in a fully downstream gate closed position and valve pin 41' is in its upstream open flow position. The operation of downstream actuators 208' is similarly controlled by the algorithm of computer 20 based on the sensor 60t, 80t signal data that is sent to computer and used by the algorithm as a variable input. As with the embodiments described above, the downstream actuators 208' provide the function of opening and closing the gates at the beginning and end of an injection cycle while the upstream rotary valves 200' provide the function of controlling the rate of fluid flow during the injection cycle between start and stop. As described above with reference to FIGS. 9-11, a flow rate profile can be predetermined and stored and the operation of rotary valves 200' can then be controlled by computer 20 to emulate the predetermined flow rate profile that is stored in computer 20 or other memory communicating with the algorithm of computer 20.

What is claimed is:

1. An injection molding system comprising: a manifold having a plurality of manifold melt channels for conveying a melt stream; a plurality of nozzles, wherein each nozzle has a nozzle melt channel fluidly connected to a respective manifold melt channel and an actuated valve pin having a terminal end disposed within a portion of said nozzle melt channel proximate to a mold gate and slidably positionable for controlling the flow of the melt stream into a mold cavity via the mold gate; and an actuated flow control pin having a flow control surface disposed upstream of the terminal end of said actuated valve pin that is slidably positionable for controlling the flow rate of the melt stream towards the mold gate, wherein said valve pin and said flow control pin are independently actuated.

2. The injection molding system of claim 1, wherein the actuated flow control pin is disposed within the nozzle melt channel.

3. The injection molding system of claim 1, wherein the actuated flow control pin is disposed within the manifold melt channel.

4. The injection molding system of claim 1, wherein each nozzle is in fluid communication with a separate mold cavity.

5. The injection molding system of claim 4, wherein each mold cavity is of substantially equal size.

6. The injection molding system of claim 4, wherein at least one mold cavity is of a different size.

7. The injection molding system of claim 1, wherein at least two nozzles are in fluid communication with a single mold cavity.

8. The injection molding system of claim 1, wherein said actuated valve pin and said actuated flow control pin are actuated based on injection pressure information received from at least one pressure sensor.

9. The injection molding system of claim 8, wherein said at least one pressure sensor is in communication with said nozzle melt channel.

10. The injection molding system of claim 8, wherein said at least one pressure sensor is in communication with said mold cavity.

11. The injection molding system of claim 1, wherein said flow control pin has a shaft portion and a terminal end, wherein said terminal end has a larger outer diameter than said shaft portion and includes said flow control surface.

12. The injection molding system of claim 1, wherein at least one of said actuated valve pin and said actuated flow control pin are actuated based on temperature information received from at least one temperature sensor.

13. An injection molding apparatus comprising: a manifold having a manifold melt channel; a nozzle having a nozzle melt channel; a mold cavity having a mold gate to receive a molten material from said nozzle melt channel; a first actuated valve pin to control the flow of said molten material, said first actuated valve pin having a flow control surface configured to constrict the flow of said molten material; and a second actuated valve pin to further control the flow of said molten material from said nozzle melt channel into said mold cavity via said mold gate.

14. The injection molding apparatus of claim 13, wherein said first actuated valve pin and said second actuated valve pin are independently movable and each has a downstream end located at least partially within said nozzle melt channel.

15. The injection molding apparatus of claim 13, wherein said first actuated valve pin has a downstream end that is movable in said manifold melt channel and said second actuated valve pin has a downstream end that is movable in said nozzle melt channel.

16. The injection molding apparatus of claim 13, wherein said first actuated valve pin and said second actuated valve pin are actuated based on injection pressure information received from at least one pressure sensor.

17. The injection molding apparatus of claim 16, wherein said at least one pressure sensor is in communication with said nozzle melt channel.

18. The injection molding apparatus of claim 16, wherein said at least one pressure sensor is located in said mold cavity.

19. The injection molding apparatus of claim 13, wherein said second actuated valve pin is actuated along said nozzle melt channel.

20. The injection molding apparatus according to claim 14, wherein said first actuated valve pin and said second actuated valve pin are movable along a common axis.

21. The injection molding apparatus of claim 13, wherein said first actuated valve pin has a shaft portion and a terminal end, wherein said terminal end has a larger outer diameter than said shaft portion and includes said flow control surface.

22. The injection molding apparatus of claim 13, wherein said flow control surface of said first actuated valve pin constricts the flow of said molten material when positioned within a portion of said nozzle melt channel having a complementary shape to that of said flow control surface.

23. The injection molding apparatus of claim 15, wherein said flow control surface is on the downstream end of said first actuated valve pin to constrict the flow of said molten material when positioned within a portion of said manifold melt channel having a complementary shape to that of said flow control surface.

24. The injection molding apparatus of claim 14, wherein said second actuated valve pin is actuated laterally with respect to said first actuated valve pin.

\* \* \* \* \*